United States Patent
Danis et al.

(10) Patent No.: US 8,959,097 B2
(45) Date of Patent: Feb. 17, 2015

(54) PRIVACY-PRESERVING METHOD FOR SKIMMING OF DATA FROM A COLLABORATIVE INFRASTRUCTURE

(75) Inventors: Catalina M. Danis, Mount Vernon, NY (US); Thomas D. Erickson, Minneapolis, MN (US); Mary E. Helander, White Plains, NY (US); Wendy A. Kellogg, Yorktown Heights, NY (US); Rhonda Rosenbaum, Millwood, NY (US); David S. Singer, Los Gatos, CA (US); Calvin B. Swart, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 12/723,193

(22) Filed: Mar. 12, 2010

(65) Prior Publication Data

US 2011/0225200 A1    Sep. 15, 2011

(51) Int. Cl.
*G06F 17/30* (2006.01)
*G06F 7/00* (2006.01)
*G06Q 10/10* (2012.01)

(52) U.S. Cl.
CPC .......... *G06Q 10/10* (2013.01); *G06F 17/30507* (2013.01); *G06F 17/30563* (2013.01); *G06F 17/3069* (2013.01)
USPC ........... 707/756; 707/661; 709/201; 709/206; 709/220

(58) Field of Classification Search
CPC .............. G06F 17/30569; G06F 17/30; G06F 17/30563
See application file for complete search history.

(56) References Cited

U.S. PATENT DOCUMENTS

| 7,784,097 | B1 * | 8/2010 | Stolfo et al. | 726/23 |
| 7,945,622 | B1 * | 5/2011 | Pegg | 709/204 |
| 2004/0181579 | A1 * | 9/2004 | Huck et al. | 709/205 |
| 2004/0240652 | A1 * | 12/2004 | Kanada | 379/201.1 |
| 2005/0108372 | A1 * | 5/2005 | Guo et al. | 709/223 |
| 2005/0138110 | A1 * | 6/2005 | Redlich et al. | 709/201 |
| 2006/0041648 | A1 * | 2/2006 | Horvitz | 709/220 |
| 2006/0052945 | A1 * | 3/2006 | Rabinowitz et al. | 702/20 |
| 2008/0082526 | A1 * | 4/2008 | Kanawa | 707/5 |
| 2008/0196098 | A1 * | 8/2008 | Cottrell et al. | 726/12 |
| 2009/0300716 | A1 * | 12/2009 | Ahn | 726/1 |

OTHER PUBLICATIONS

IBM® LOTUS® NOTES® Calendaring & Scheduling Schema Jul. 2007, http://www.ibm.com/developerworks/lotus/documentation/dw-l-calendarschema.html.

* cited by examiner

*Primary Examiner* — Dung K Chau
(74) *Attorney, Agent, or Firm* — Scully, Scott, Murphy & Presser, P.C.; Daniel P. Morris, Esq.

(57) ABSTRACT

A method and system for harvesting collaboration data in accordance with a privacy policy is provided. In one embodiment, the method comprises defining a privacy policy for collaboration data, said privacy policy including a list of fields associated with the collaboration data to be harvested; harvesting the collaboration data associated with the fields specified as allowable under the privacy policy; transforming the collaboration data associated with the fields specified as allowable if said collaboration data can be transformed in accordance with a set of rules defined in the privacy policy; and storing the harvested collaboration data in a database.

24 Claims, 4 Drawing Sheets

FIG. 1

MY PRIVACY POLICY ("GLOBAL INC DEFAULT" PLUS 8 AMENDMENTS)

| Current Policy | Edit this Policy | Generate examples from applying this policy | Policy amendment and use history |

Base policy template
- 203 — ⦿ Global Inc. Default
- 204 — ○ Opt Out (Total Privacy)
- 205 — ○ Select from shared....

Global Inc Default. This policy template is the most transparent recommended by Global Inc. Choose this if you have no special concerns about sharing your data. Note that you can add amendments to keep some of your data private.

MY AMENDMENTS ( TO "GLOBAL INC DEFAULT" )   202

Data that may be captured

*No additions to base policy tempate's "Data that may be mined"*   212

[Add amendment......]  [Show base policy tempate's "Data that may be captured"...]

Data that must be transformed as specified before capture
- 215 — Name :: in calendar entries :: must be replaced with unique pseudonyms  (info) (edit)
- 216 — Phone numbers :: anywhere :: must have last seven digits replaced with x's  (info) (edit)
- 217 — URLs :: anywhere :: must be replaced with the string "URL"  (info) (edit)
- 218 — photos :: anywhere :: must be degraded to 10% of original resolution  (info) (edit)
- 219 — attachments :: anywhere :: must be replaced with MD5 hash of attachment  (info) (edit)

*Plus base policy tempate's "Data that must be transformed" ...*   206

223 — [Add amendment......]  [Show base policy tempate's "Data that must be transformed"...] — 224

Data that may not be captured
- 220 — Any data :: in calendar entries, marked "private"  (info) (edit)
- 221 — Any data :: in email, with addresseess not @global_inc  (info) (edit)
- 222 — Any data :: in email, in "From" field  (info) (edit)

*Plus base policy tempate's "Data that may not be mined" ...*   209

[Add amendment......]  [Show base policy tempate's "Data that may not be mined"...]

Description of policy as amended (required if policy is to be shared)

Personally I'm not concerned about making my information available to Global Inc., since it's virtually all business related. However, I know some of my colleagues feel differently, so I'm specifying that names be pseudonymized and phone numbers and URLs masked. And of course if I've marked a meeting "private", it should stay that way.

[Save Policy]   [Share Policy]   [Revert...]   210
     213             211            214

FIG. 2

MY PRIVACY POLICY ("GLOBAL INC DEFAULT" PLUS 8 AMENDMENTS) — 225, 226, 227, 228

| Current Policy | Edit this Policy | Generate examples from applying this policy | Policy amendment and use history |

An Example of Applying My Policy
*Elements altered by Policy are underlined*

Calendar Entry
Meeting

| | | |
|---|---|---|
| Chair | John Doe/White Plains/IBM | 302 |
| | Sent By: Jane Doe | |
| Suspect | SMARTER BUILDING TELECON (January, 2010)<br>US Toll-Free: 1-888-xxx-xxxx, Int'l: + 1-213-xxx-xxxx<br>Access Code: 4506790, Host Password: xxxx<br>Chair: John Doe<br>c: Jane Doe  914-xxx-xxxx | 304 |
| When | Meeting occurs in a different time zone (GMT-05:00) New York, Montreal, Nassau, Grand Turk<br>Time in the local time zone<br>Starts  Tue 01/26/2010  08:00 AM<br>Ends   Tue 01/26/2010  09:00 AM   1 hour | |
| Invitees | Required (to): Alfread von Doe/Netherlands/IBM@IBMNL, Bethany J Simpson/Argentina/IBM@IBMAR, Carlos Santiago/Seattle/IBM@IBMUS,<br>Optional (cc): Asta Campo/Somers/IBM@IBMUS, Charlie Devans/Austin/IBM@IBMUS | |
| Description | | |

LotusLive Info:
- For IBM employees, send the following link:
  https://URL
- For people outside IBM, send the following link:
  https://URL 306 — Generate example from calendar data        Generate example from email data — 308
310 — Generate example from instant message logs    Generate example from.........

PRIVACY-PRESERVING METHOD FOR SKIMMING OF DATA FROM A COLLABORATIVE INFRASTRUCTURE

BACKGROUND

The present invention relates generally to the harvesting of collaboration data, and particularly to a method and system that harvests collaboration data while preserving the privacy of the senders and recipients of the collaboration data.

Computational systems that enable people to communicate with each other play an increasingly central role in the functioning of large organizations. These computational systems provide a collaborative infrastructure that facilitates communication. The modern collaborative infrastructure can include file sharing, document libraries, chat rooms, application sharing, video conferencing and discussion forums to name only a few. Communications may be categorized as linguistic, such as an email, and as non-linguistic, such as file or application sharing. The communications, by their very nature, contain data that is of potential value to the organization. For example, an email not only contains information within the body of the email, but also associated metadata about who is communicating with whom, and when that communication occurs. The information contained within the metadata is just as valuable to the organization as the original message conveyed in the email.

Certain aspects of communication between individuals are often regarded as confidential and private. This is true regardless of whether the organization has a policy explicitly stating that all communications that occur over its systems are property of the organization. An expectation of privacy facilitates communication about a wide range of issues, some of which may be unpopular, tentative, or informal. Free and unimpeded communication between parties improves the quality of the decision making process of an organization and enables the organization to reach better decisions.

Existing solutions to ensure privacy include such methods as user authentication to the computational systems, which prevents unauthorized access to the collaboration data. P3P, also known as Platform for Privacy Preferences, enables a website to express its privacy practices in a standard format that can be retrieved automatically and interpreted easily by users. However, neither of these solutions allow the collection or analysis of collaboration data in an adjustable manner while also preserving the privacy of the communicators.

Therefore, an improved methodology and framework for harvesting and analyzing information from an organization's collaboration data is desirable. It is further desirable that the improved methodology and system preserves the privacy of the communicators.

SUMMARY

A method and system for producing a set of collaboration data in accordance with a privacy policy is provided. In one embodiment, the method comprises defining a privacy policy for collaboration data, said privacy policy including a list of fields associated with the collaboration data to be harvested; harvesting the collaboration data associated with the fields specified as allowable under the privacy policy; transforming the collaboration data associated with the fields specified as allowable if transformed in accordance with a set of rules defined in the privacy policy; and storing the harvested collaboration data in a database.

In another embodiment, a system for harvesting collaboration data, comprising a processor operable to define a privacy policy for collaboration data, said privacy policy including a list of fields associated with the collaboration data to be harvested, harvest the collaboration data associated with the fields specified as allowable under the privacy policy, transform the collaboration data associated with the fields specified as allowable if transformed in accordance with a set of rules defined in the privacy policy, and store the harvested collaboration data in a database.

A computer program product employing the above method is also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is an example of how a user may edit a privacy policy;

DETAILED DESCRIPTION

A method and system of the present invention allows collaboration data to be harvested in a manner that preserves the privacy of the communicators. Collaboration data includes, but is not limited to, email messages, calendar entries in calendar programs and meeting and appointment schedules, and other information related to how groups of people work together in an organization. For example, an email may contain a message that is extremely personal and confidential between the sender and the recipient. However, metadata associated with the email, such as the time and date the email was sent, who sent the email, and who received the email, may all be of value to an organization. It is not necessary to know the content of the email for the organization to benefit from the non-identifying metadata associated with the email. Therefore, information beneficial to the organization may be harvested from the metadata by the method and system of the present invention. It should be understood, however, that the method and system of the present invention can also be applied to collaboration data generated by calendar programs and scheduling software etc., and is not limited to only email.

In one embodiment, the method and system harvests collaboration data in accordance with a user defined privacy policy. A series of user defined rules determine what collaboration data is allowable under the privacy policy, and what data is unallowable under the privacy policy. If possible, unallowable data under the privacy policy is transformed into data that is allowable under the policy. For example, if the policy provides for anonymity of the senders and receivers, then personally identifying information, such as a name, is replaced with a character string or text such as a pseudonym, allowing the anonymized data to be harvested. The privacy policy may be set or adjusted by a user so that all of the user's collaboration data is harvestable, or so that only certain types of collaboration data are harvestable.

Figure 3:
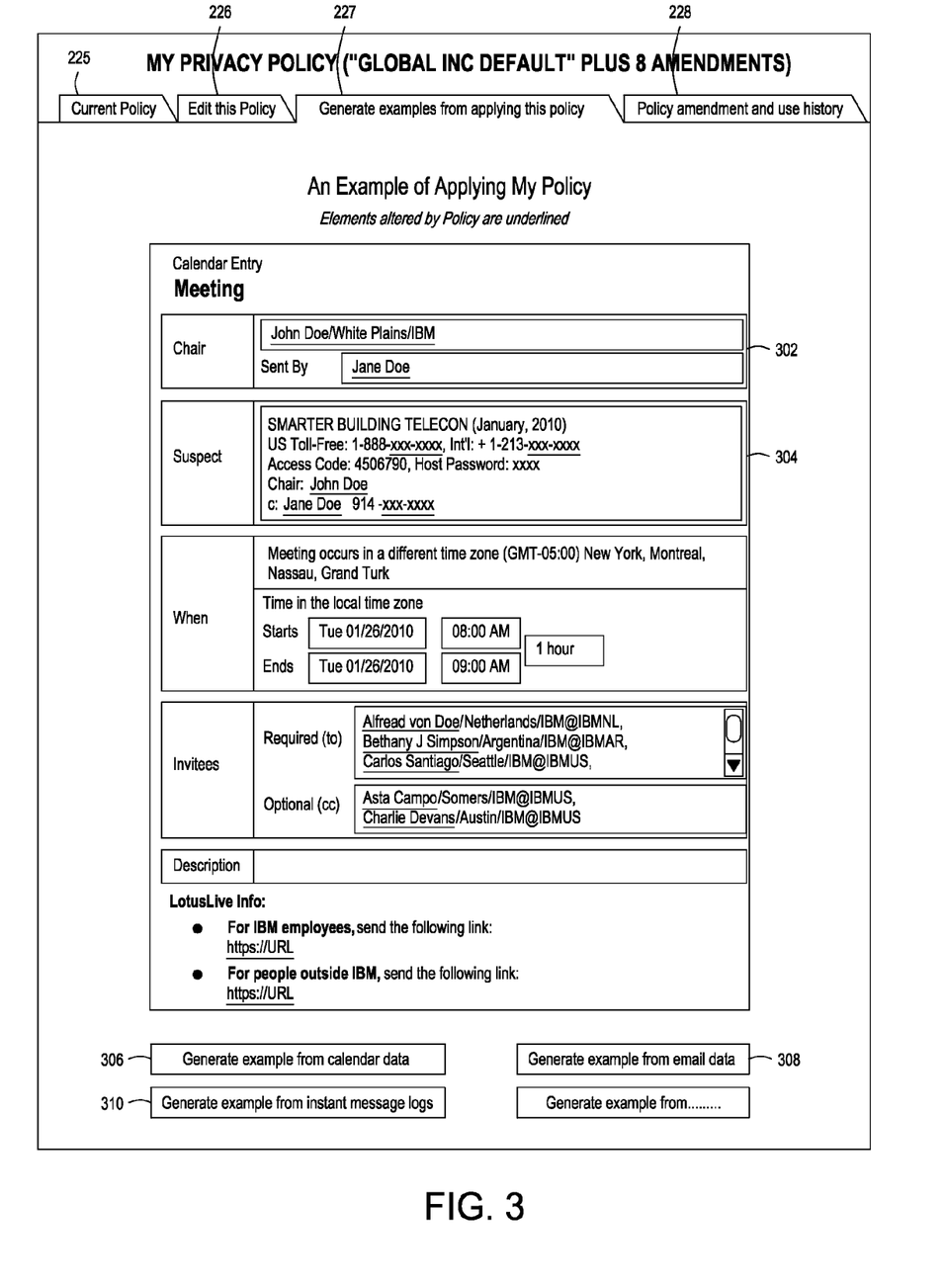
FIG. 3 provides several "before" and "after" examples of the effects of the privacy policy on collaboration data.

Referring now to FIG. 3, there is depicted several "before and after" examples that may be generated for a user showing how the collaboration data may be transformed prior to harvesting in accordance with the rules of the privacy policy. FIG. 3, as an example, shows a calendar entry generated by the collaboration software. In one embodiment, names associated with the calendar entry (shown in section 302) are transformed in accordance with one embodiment of the invention. For example, "Bob Jones" is replaced by "John Doe" and "Mary Smith" is replaced by "Jane Doe". As shown in section 304 of the calendar entry, telephone numbers have their last 7 digits masked by x's so that "1-888-555-1212" is replaced by "1-888-xxx-xxxx" in accordance with a privacy policy. Other information present in section 304, such as a host password for a teleconference is also masked by "xxxx". In other embodiments, website addresses such as "http://www.ibm.com" may be replaced with the character string "URL" as shown in FIG. 3. In another embodiment, the information deemed sensitive or confidential by a policy rule may be replaced by hashes, such as an MD5 hash. A hash obscures the value of the field while still allowing a user or a program to compare different field values to determine if the value stored in the field is the same as another harvested field value. The "before and after examples" allow the user to view the effects of and/or adjust the privacy policy settings.

In one embodiment, the user can generate 'before and after' examples of the privacy policy's effect on the collaboration data by selecting buttons 306, 308 or 310. In one embodiment, selecting the button 'Generate example from calendar data' 306 generates an anonymized calendar entry from collaboration data stored in a 'mailfile'. An example of an anonymous calendar entry is shown throughout FIG. 3. The user may also generate an example of an anonymized email (not shown) by selecting the button 'Generate example from email data' 308 and generate an example of an anonymized instant message (not shown) by selecting the button 'Generate example from instant message logs' 310. Further details on how an anonymized email, calendar entry and instant message are generated are presented below.

Referring back to FIG. 1, a method in accordance with one embodiment of the present invention for harvesting collaboration data is provided. At step 102, a privacy policy for collaboration data is defined. Referring now to FIG. 2, in one embodiment, the rules of the privacy policy are set by the end user through a graphical user interface (GUI) presented to the user on a monitor or a display device by an application plug-in. In one embodiment, tabs 225, 226, 227 and 228 running across the top of the GUI allow the user to switch between different screens related to the privacy policy. The user may view the current privacy policy and the rules associated with the current privacy policy by selecting tab 'Current Policy' 225. The user may edit the current privacy policy by selecting tab 'Edit This Policy' 226. An example screenshot of the GUI in 'Edit This Policy' mode is shown throughout FIG. 2. The user may also view the effects of the privacy policy on collaboration data by selecting tab 'Generate examples from applying this policy' 227. An example of the effects of the privacy policy on collaboration data are further shown in FIG. 3. The user may also view a change log related to the privacy policy by selecting tab 'Policy amendment and use history' 228.

One section of the GUI associated with tab 'Edit This Policy' 226, section 202, allows the user to select a "default privacy policy" 203, "opt out" 204 from sharing or providing access to any collaboration data to third parties or "select a shared privacy policy from a library of privacy policies" 205. In one embodiment, the user marks or selects among these options 203, 204 and 205 by clicking on an appropriate radio button. The end user also has the ability to edit the current privacy policy by setting privileges for each category of collaboration data in sections 212, 206 and 209. The privacy policy defines: 1) specific types or categories of collaboration data that can be captured (212); 2) specific types or categories of collaboration data that cannot be captured (209); and 3) specific types or categories of collaboration data that can be captured if transformed prior to harvesting in certain ways (206). Categories of collaboration data may include the following: 'names' 215, 'phone numbers' 216, 'URLs' 217, 'photos' 218, 'attachments' (i.e., file attachments to emails) 219, and 'private calendar entries' 220. Other categories of collaboration data rely upon a user set rule. For example, email filtering rules can sort email based upon information in the 'to' 'from' and 'subject' lines of the email. As an example, the category 'email with addresses not @ global_inc' 221 identifies collaboration data that does not originate from the domain 'global_inc'.

Categories of collaboration data can be added to a section 212, 206 or 209 by the user clicking on the 'Add amendment' button 223 within the appropriate section. For example, a user may want to allow 'telephone numbers' 216 to be harvested as long as the telephone number is transformed. The user can add 'telephone numbers' 216 to section 206 by clicking on the 'Add amendment' button 223 and selecting 'telephone numbers'. Other categories, as defined by the collaboration software, may also be selected and added to section 206. Once a category is added to a section the privileges associated with that category can be set or edited by the user. The 'Show base policy template' button 224 shows which categories of data are present in a section 212, 206 or 209 as defined by a default privacy policy. This allows the user to compare the current privacy policy to the default privacy policy and determine if the user privacy policy is more or less restrictive than the default privacy policy.

Privileges for each category may be set by the user clicking on the "edit" button 208 associated with that particular category, while information about the current privileges and rules associated with that particular category may be shown by clicking on the "info" button 207 associated with that particular category. After a user sets the privacy policy, the current policy may be saved by selecting the "save policy" 213 option, or any changes made to the current policy can be undone by selecting the "revert policy" 214 option. In one embodiment, any changes to the current privacy policy are recorded to a change log, which allows the user to revert back to a prior privacy policy.

In one embodiment, these categories correspond to defined fields within collaboration software such as IBM® LOTUS® NOTES® available from International Business Machines Corp. of Armonk, N.Y. These fields are well documented metadata fields such as '$PublicAccess' which stores a value that controls whether a calendar and scheduling entry is publicly viewable and 'BlindCopyTo' which stores the names of any 'BCC' recipients. A complete description of these fields and their associated field values are publicly available from IBM® LOTUS® NOTES® Calendaring & Scheduling Schema Jul. 2007 from the website http://www.ibm.com/developerworks/lotus/documentation/dw-I-calendarschema.html which is incorporated by reference in its entirety. Other examples of fields include telephone numbers, telephone number area codes and exchanges, business department identifiers, meeting times, and acceptance or rejection of a meeting time and any subsequent rescheduling of a rejected meeting schedule.

Each of these fields is associated with one or more user defined privileges. The privileges, or privacy policy setting, indicate whether collaboration data can be harvested from the field. One or more rules, such as whether or not the collaboration data stored within the field should be made anonymous and how to anonymize the collaboration data is also associated with each field. For example, the privacy policy may allow the privilege of information about the sender and the recipient of an email to be harvested. However, the privacy policy may also require that the names of the sender and the recipient remain anonymous. As one example of how the invention functions, the collaboration data is harvested from the specified metadata fields of the email, but the names of the sender and recipient of the email are replaced with their job titles, e.g., "manager", "assistant", "associate", etc. thus preserving anonymity. In another embodiment, the names of the sender and recipient may also be replaced with a hash value to provide greater anonymity.

In one embodiment, user defined privacy policies can be stored in a library of privacy policies and shared with other users by selecting the "share policy" 211 option. This allows a department manager to create a privacy policy and a set of rules and privileges for each field and share the privacy policy with an entire group of co-workers. A person would be able to select the predefined privacy policy from the library without individually setting the rules and privileges for each category of collaboration data. A written description of how the privacy policy affects collaboration data is provided within dialog box 210. Dialog box 210 may also be used to provide any legal disclaimers or other information about the use of the privacy policy.

Referring back to FIG. 1, at step 104, the user is made aware of the privacy policy. In one embodiment, the user of the collaboration software is made aware of the privacy policy by a message displayed on a display screen of the user device after the user connects to a communications network. In one embodiment, the privacy policy is displayed to the user as a splash screen, and the user must acknowledge the privacy policy and its terms before being allowed to send any collaboration data, e.g., email, across the communications network. At decision step 105, the user is given the choice to "opt out", i.e., not allow the harvesting of any collaboration data. If the user opts out the method immediately ends. There may be many reasons why the user may elect to opt out, including legal obligations to the organization, e.g., the user is part of the organization's legal department, or a heightened need for privacy, e.g. the user is a high level officer of the organization. If the user does not opt out, then the method proceeds to step 106. At step 106, filtering software on the client computer retrieves the collaboration data processed by the collaboration software. In one embodiment implementing collaboration software LOTUS NOTES®, collaboration data pertaining to email messages, calendaring and schedules are stored remotely on a server in a 'mailfile' and locally on the client computer in a 'replica mailefile' which is a duplicate copy of the remotely stored 'mailfile'. The collaboration software may also have an instant messaging feature that generates collaboration data. As an example, LOTUS NOTES® has a built-in instant messaging feature that allows users to communicate with each other and in groups of users. In one embodiment, collaboration data related to instant messaging is stored in a file in the form of a 'chat log'. These chat logs may be stored locally on the user's computer or remotely on a server and include at least the names or 'user ids' of the communicators in addition to other collaboration data. In one embodiment, the filtering software is a plug-in that interfaces with the collaboration software and is coded in an object oriented programming language such as JAVA®, PYTHON® or RUBY®. In another embodiment, the filtering software is a stand-alone external program that is separately operated on the client computer aside from the collaboration software and acts independently on the collaboration data. Both implementations of the filtering software access the collaboration data through either an actual file path or a relative file path to the 'mailfile'.

Figure 1:
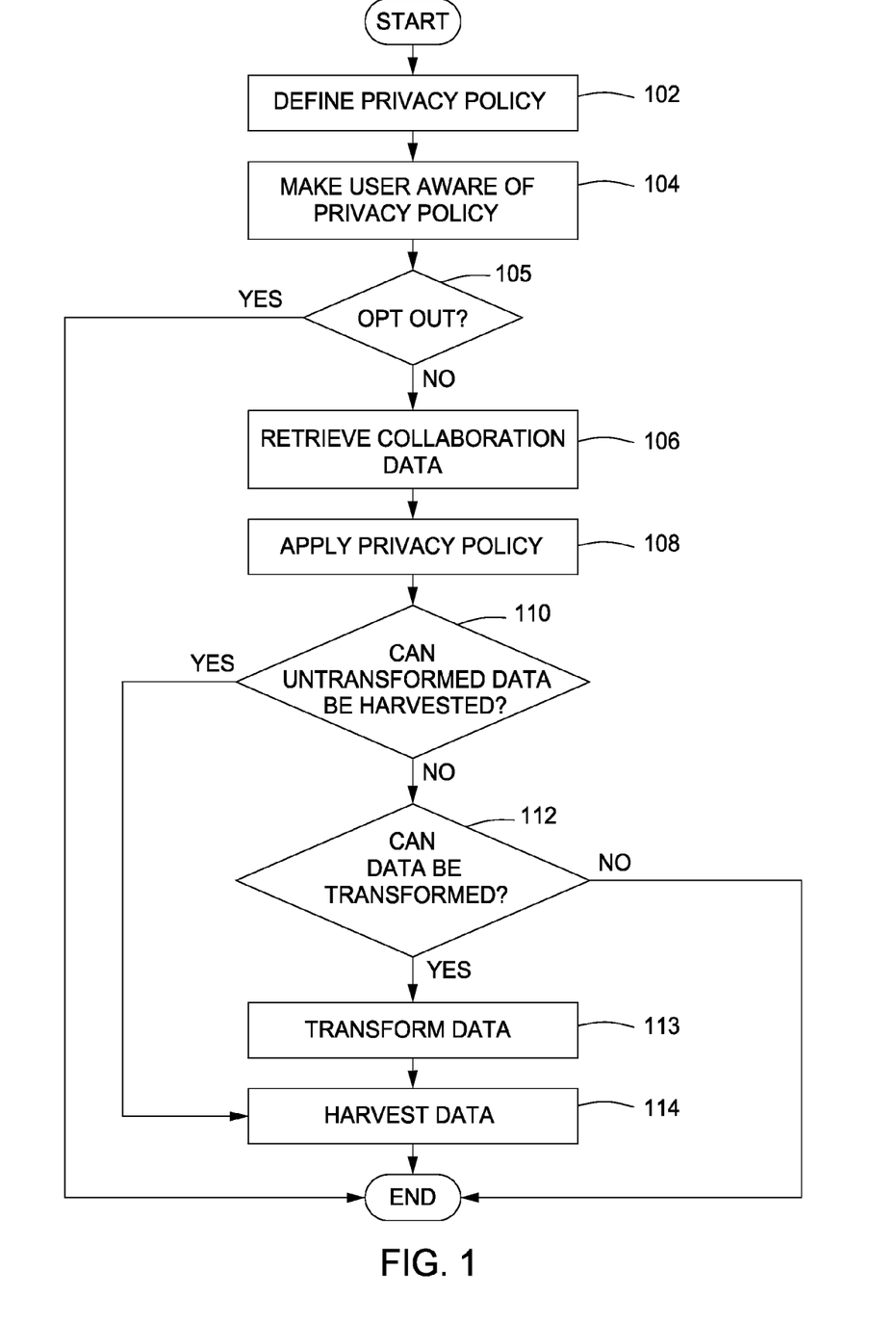
FIG. 1 is a flow diagram illustrating a method of the present invention in one embodiment for harvesting collaboration data.

At step 108, the plug-in applies the privacy policy and the rules that were set by the user at step 102 to the collaboration data. In one embodiment, the collaboration data is scanned by the plug-in to determine if any fields present match the fields set in the privacy policy. If the fields match, the privileges associated with those fields are checked to determine if the collaboration data stored in those fields can be harvested. In one embodiment, the plug-in separates the collaboration data into one of three categories: 1) collaboration data that is allowable to be captured; 2) collaboration data that is not allowable to be captured; and 3) collaboration data that is allowable to be captured if transformed.

At decision step 110, a determination is made as to whether the collaboration data is allowable to be harvested by the filtering software under the privacy policy. If the collaboration data is allowable to be harvested then the method proceeds to step 114. At step 114, the collaboration data is harvested by extracting the collaboration data from the metadata field in accordance with the user defined rules and privileges. The collaboration data may include the identity of the communicators, the time of communication, whether the communication was a reply to a prior communication, or a forward of a prior communication, routing information related to the communication, telephone numbers, etc. In one embodiment, the harvested collaboration data is stored in another file separate from the 'mailfile' or stored in a memory storage device, e.g., searchable database.

If the collaboration data is not allowable under the privacy policy, then the method proceeds to decision step 112. At step 112, the method determines if the collaboration data can be transformed in accordance with one or more user defined rules that would make it allowable under the privacy policy. Certain collaboration data may be "MARKED PRIVATE" by the end user and thus never harvestable or transformable. The "MARKED PRIVATE" function is a well documented feature of collaboration software such as IBM® LOTUS® NOTES®. If the decision is no, i.e., the collaboration data cannot be transformed, then the method ends. If the decision is yes, then the method proceeds to step 113. At step 113 the collaboration data is transformed in accordance with user defined rules. For example, emails from an attorney may be identified by the plug-in and removed from the collaboration data to preserve attorney-client privilege. In another embodiment, if the collaboration data includes an image or a photograph (commonly identified by the file extension .jpg, .gif, .bmp etc.) the transformation process may entail degrading the quality of the image so the people or objects in the image cannot be readily identified. Image quality may be degraded by applying a filter, such as a blur filter to the image, and only allowing the filtered image to be harvested. In another embodiment, an attached file may be identified by a hash, such as an MD5 hash, which identifies the file without revealing the contents of the file.

In yet another embodiment, the collaboration data may include information gathered from calendars and schedules. Calendars and schedules often contain information about meetings, times of meetings, meeting participants, telephone numbers associated with the meetings, and meeting locations. Often, a telephone number may be enough to reveal the identity of the meeting participants. For example, a telephone number beginning with an (888) area code may reveal that a teleconference call took place at a certain date and time. A pass code associated with the telephone number may reveal the identity of the participants who dialed into the teleconference call. The collaboration data may be transformed by masking all or part of the telephone number or masking the pass code with a character such as an 'x' to preserve the identity of the participants. In another embodiment, the telephone number or a portion of the telephone number may be replaced by a hash. After the data is transformed, the method then proceeds to step 114, and as discussed above the collaboration data is harvested.

Collaboration data that is not allowed to be harvested and that cannot be transformed is allowed to pass through the plug-in unaltered and is not stored. In one embodiment, the collaboration data that is harvested is stored in a searchable database for later analysis. The stored information may reveal communication patterns, connections between coworkers, connections between employees and the outside world, and how decisions are made within the organization.

Figure 4:
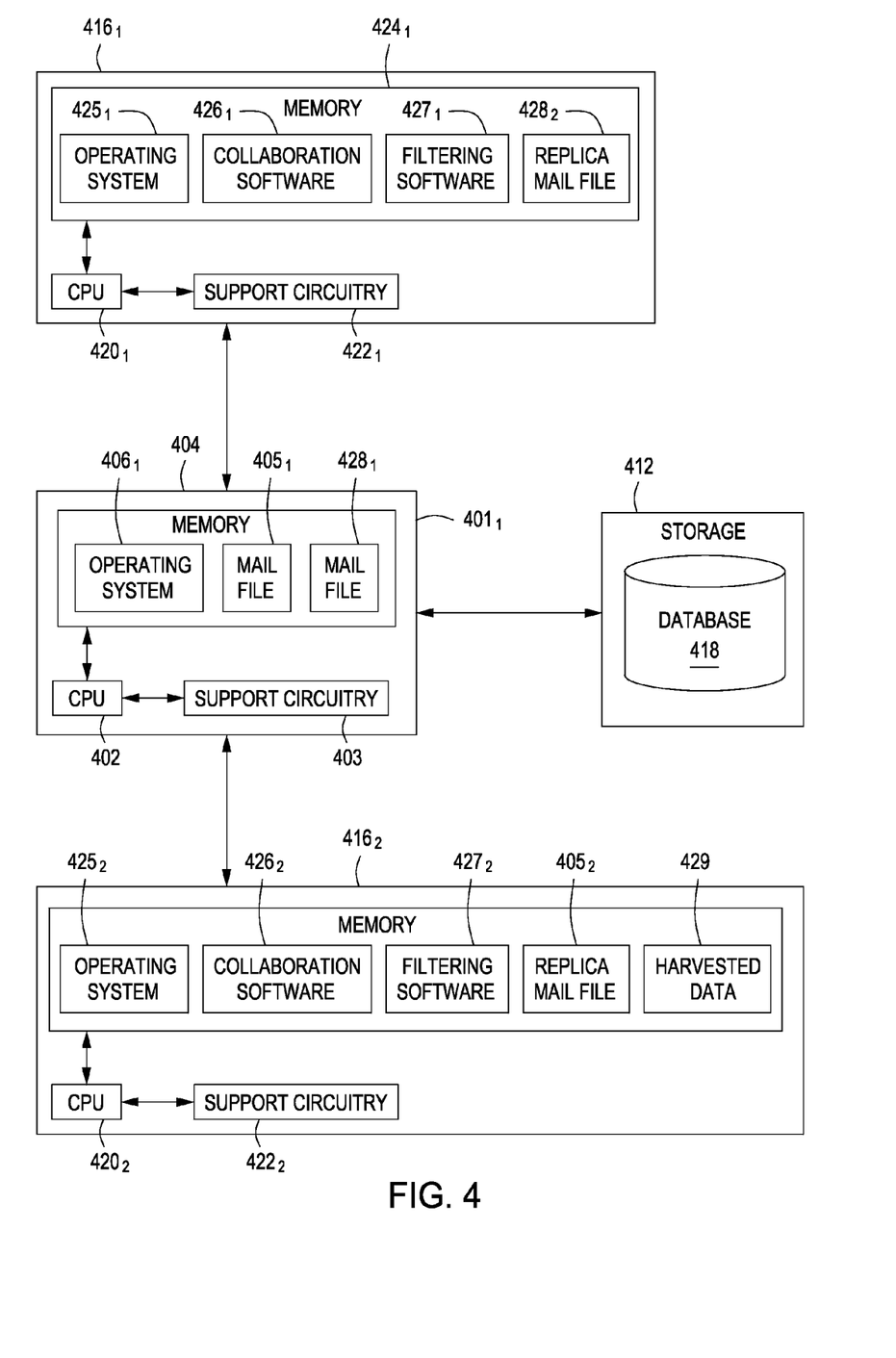
FIG. 4 is an architectural diagram illustrating an infrastructure in which the invention is implemented according to one embodiment.

FIG. 4 is an architectural overview of a computing environment 400 in which the invention may be implemented. As illustrated in FIG. 4, a server 401 is situated between two client computers $416_1$ and $416_2$. The client computers 416 may be desktop computers, laptop computers, or any other device that may benefit from connection to a computer network. One would appreciate that there could be multiple client computers $416_n$ routing collaboration data through the server 401. The server 401 may be coupled directly to the client computers 416 as shown, or coupled indirectly via a network such as the Internet, Ethernet, private local area network (LAN) and the like.

In one embodiment, the server 401 comprises a central processing unit (CPU) 402, a memory 404, mass storage 412, and support circuitry 403. The CPU 402 is interconnected to the memory 404 and the support circuitry 403. The support circuitry includes cache, power supplies, clocks, input/output interface circuitry, a network interface and the like. The mass storage 412 may be physically present within the server or operably coupled to the server 401 as part of a common mass storage system that is shared by a plurality of servers. In one embodiment, the mass storage comprises a searchable database 418. In one embodiment, the database 418 stores the information harvested from the collaboration data.

The memory 404 may include random access memory, read only memory, removable disk memory, flash memory, and various combinations of these types of memory. The memory 404 is sometimes referred to as a main memory and may in part be used as cache memory. The memory 404 stores an operating system (OS) 406 and individual 'mailfiles' for each user of the collaboration software. As an example, 'mailfile' $405_1$ corresponds to the user of client computer $416_2$ and 'mailfile' $428_1$ corresponds to the user of client computer $416_1$. The mailfiles $405_1$ and $428_1$ store the collaboration data generated by their respective users.

The client computers 416 comprise a central processing unit (CPU) 420, a memory 424, and support circuitry 422. The CPU 420 is interconnected to the memory 424 and the support circuitry 422. The support circuitry includes cache, power supplies, clocks, input/output interface circuitry, a network interface and the like.

The memory 424 may include random access memory, read only memory, removable disk memory, flash memory, and various combinations of these types of memory. The memory 424 is sometimes referred to as a main memory and may in part be used as cache memory. The memory 424 stores an operating system (OS) 425, collaboration software 426 such as IBM® LOTUS® NOTES®, and filtering software 427. Each of the client computers 416 also stores a local copy or a 'replica mailfile' of the user's 'mailfile' that is stored on the server 401. As an example, client computer $416_2$ stores a 'replica mailfile' $405_2$ of remotely stored 'mailfile' $405_1$ and client computer $416_1$ stores a 'replica mailfile' $428_2$ of remotely stored 'mailfile' $428_1$. In one embodiment, the 'mailfiles' store email data (including email metadata) utilized by the collaboration software and the filtering software 427 implements the privacy policy and the rules described above. In one embodiment, the filtering software 427 is a plug-in which interacts with the collaboration software 426 via an API. In another embodiment, the filtering software 427 is an external process initiated by the user separately from the running of the collaboration software 426. The following example assumes the user's collaboration data is stored in both 'mailfile' $405_1$ and 'replica mailfile' $405_2$. In one embodiment, the filtering software 427 operates on the collaboration data stored in the user's 'replica mailfile' $405_2$ associated with the collaboration software 426 to apply the rules defined in the privacy policy. In another embodiment, the filtering software 427 could operate on the collaboration data remotely stored on the server 401 in the user's 'mailfile' $405_1$.

The filtering software 427 retrieves the collaboration data from the 'replica mailfile' $405_2$ and filters the collaboration data in accordance with the privacy policy and the user defined rules as discussed above. The filtering software then harvests the filtered data and stores the harvested data, i.e., the fields and the content of the fields, in a searchable database, e.g., database 418 or another file, e.g., 'harvested data' 429. In one embodiment, the filtering software also enforces the privacy policy when another user or client computer requests information. For example, if client computer $416_2$ requests information from client computer $416_1$, the filtering software 427 may intercept the request and provide client computer $416_2$ with access to only the anonymized data stored in file 429.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 3. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method for harvesting collaboration data produced by a collaboration application corresponding to a collaborative activity, said method comprising:

defining, by a user, a privacy policy for collaboration data prepared by said user, said privacy policy including a list of fields that identify the collaboration data to be harvested and a corresponding user-defined privilege indicating whether or not the collaboration data is to be harvested from said fields and a defined rule permitting harvesting with an applied transformation to said collaboration data prior to harvesting, said fields corresponding to metadata fields defined within the collaboration application; and prior to harvesting:

implementing a program at a user device that interacts with said collaboration software via an interface to scan stored collaboration data generated by that user and stored at said user device;

determining from said scan any fields present that match the fields in the list of fields in said user privacy policy; and checking, for the fields that match, whether the privileges associated with those fields in the list permit harvesting of the collaboration data stored in the matched fields;

harvesting the user generated collaboration data associated with the matched fields whose privileges are specified as allowable under the privacy policy; and transforming the user generated collaboration data associated with the matched fields whose privileges are specified as allowable if said collaboration data can be transformed in accordance with said defined rule in the privacy policy; and storing the harvested collaboration data in a file, wherein prior to said defining, the method further comprises:

alerting the user to the privacy policy and the defined rule in the privacy policy for the collaboration data;

alerting the user to the matched fields associated with the collaboration data to be harvested and the privileges associated with the fields in the list under the privacy policy;

allowing the user to modify the privileges or rule associated with the fields in the list; and allowing the user to opt out from participating in the harvesting of the collaboration data.

2. The method of claim 1, wherein the defined rule includes masking digits of a telephone number with a character.

3. The method of claim 1, wherein the defined rule includes replacing at least a portion of a website address with a character string.

4. The method of claim 1, wherein the defined rule includes degrading quality of an image.

5. The method of claim 1, wherein the defined rule includes calculating a hash of the collaboration data.

6. The method of claim 1, further comprising:
retrieving the collaboration data from a file;
applying the defined rule in the privacy policy to the collaboration data stored in the file; and
harvesting the collaboration data after application of the set of rules defined in the privacy policy and storing the harvested collaboration data in at least one of another file and the database.

7. The method of claim 1, wherein said collaboration data includes a communications message sent among senders and recipients collaborating via a communications infrastructure, said communications message including data stored in meta-data fields associated with the communications message, wherein a rule indicates a sender and recipient name in said meta-data fields be transformed to preserve anonymity of said sender and recipient.

8. The method of claim 7, wherein the defined rule includes replacing a sender and recipient name with a pseudonym.

9. A computer program product for harvesting collaboration data produced by a collaboration application corresponding to a collaborative activity, comprising:
a non-transitory storage medium readable by a processor and storing instructions for execution by the processor for performing a method comprising:
defining, by a user, a privacy policy for collaboration data prepared by said user, said privacy policy including a list of fields that identify the collaboration data to be harvested and a corresponding user-defined privilege indicating whether or not the collaboration data is to be harvested from said fields, and a defined rule permitting harvesting with an applied transformation to said collaboration data prior to harvesting, said fields corresponding to metadata fields defined within the collaboration application; and
prior to harvesting:
implementing a program at a user device that interacts with said collaboration software via an interface to scan stored collaboration data generated by that user and stored at said user device;
determining from said scan any fields present that match the fields in the list of field in said user privacy policy; and
checking, for the fields that match, whether the privileges associated with those fields in the list permit harvesting of the collaboration data stored in the matched fields;
harvesting the user generated collaboration data associated with the matched fields whose privileges are specified as allowable under the privacy policy;
transforming the user generated collaboration data associated with the matched fields whose privileges are specified as allowable if said collaboration data can be transformed in accordance with said defined rule in the privacy policy; and
storing the harvested collaboration data in a file, wherein prior to said defining, said method further comprises:
alerting the user to the privacy policy and the defined rule in the privacy policy for the collaboration data;
alerting the user to the matched fields associated with the collaboration data to be harvested and the privileges associated with the fields in the list under the privacy policy;
allowing the user to modify the privileges associated with the fields in the list; and
allowing the user to opt out from participating in the harvesting of the collaboration data.

10. The computer program product of claim 9, wherein the defined rule includes masking digits of a telephone number with a character.

11. The computer program product of claim 9, wherein the defined rule includes replacing at least a portion of a website address with a character string.

12. The computer program product of claim 9, wherein the defined rule includes degrading quality of an image.

13. The computer program product of claim 9, wherein the defined rule includes calculating a hash of the collaboration data.

14. The computer program product of claim 9, further comprising:
retrieving the collaboration data from a file;
applying the rule defined in the privacy policy to the collaboration data stored in the file; and
harvesting the user generated collaboration data after application of the set of rules defined in the privacy policy and storing the harvested collaboration data in at least one of another file and the database.

15. The computer program product of claim 9, wherein said collaboration data includes a communications message sent among senders and recipients collaborating via a communications infrastructure, said communications message including data stored in metadata fields associated with the communications message, wherein a rule indicates a sender and recipient name in said meta-data fields be transformed to preserve anonymity of said sender and recipient.

16. The computer program product of claim 15, wherein the defined rule includes replacing a sender and recipient name with a pseudonym.

17. A system for harvesting collaboration data produced by a collaboration application corresponding to a collaborative activity, comprising:
a processor operable to enable a user to define a privacy policy for collaboration data prepared by said user, said privacy policy including a list of fields associated with the collaboration data to be harvested and a corresponding user-defined privilege indicating whether or not the collaboration data is to be harvested from said fields, and a defined rule permitting harvesting with an applied transformation to said collaboration data prior to harvesting, said fields corresponding to metadata fields defined within the collaboration application, and
prior to harvesting, said processor operable to:
implement a program at a user device that interacts with said collaboration software via an interface to scan stored collaboration data generated by that user and stored at said user device;

determine from said scan any fields present that match the fields in the list of fields in said user privacy policy; and check, for the fields that match, whether the privileges associated with those fields in the list permit harvesting of the collaboration data stored in the matched fields;

said processor further configured to:

harvest the user generated collaboration data associated with the matched fields whose privileges are specified as allowable under the privacy policy, and transform the user generated collaboration data associated with the matched fields whose privileges are specified as allowable if said collaboration data can be transformed in accordance with said defined rule in the privacy policy, and store the harvested collaboration data in a file, wherein the processor is further operable to alert a user to the privacy policy and the defined rule in the privacy policy for the collaboration data, alert the user to the matched fields associated with the collaboration data to be harvested under the privacy policy, allow the user to modify the privileges associated with the fields in the list and allow the user the opportunity to opt out from participating in the harvesting of the collaboration data.

18. The system for of claim 17, wherein the processor is further operable to retrieve the collaboration data from a file, apply the set of rules defined in the privacy policy to the collaboration data stored in the file and harvest the user generated collaboration data after application of the said defined rule in the privacy policy and store the harvested collaboration data in at least one of another file and the database.

19. The system of claim 17, wherein the processor is further operable to mask digits of a telephone number with a character.

20. The system of claim 17, wherein the processor is further operable to replace at least a portion of a website address with a character string.

21. The system of claim 17, wherein the processor is further operable to degrade quality of an image.

22. The system of claim 17, wherein the processor is further operable to calculate a hash of the collaboration data.

23. The system of claim 17, wherein said collaboration data includes a communications message sent among senders and recipients collaborating via a communications infrastructure, said communications message including data stored in meta-data fields associated with the communications message, wherein a rule indicates a sender and recipient name in said meta-data fields be transformed to preserve anonymity of said sender and recipient.

24. The system of claim 23, wherein the processor is further operable to replace a sender and recipient name with a pseudonym.

* * * * *